United States Patent [19]
Swanson et al.

[11] Patent Number: 6,003,304
[45] Date of Patent: Dec. 21, 1999

[54] GENERATOR POWER ELECTRICALLY HEATED CATALYST SYSTEM

[75] Inventors: David Frank Swanson, Howell, Mich.; Stephen Wayne Anderson, Anderson, Ind.

[73] Assignees: STMicroelectronics, Inc., Carrollton, Tex.; General Motors Corporation, Detroit, Mich.

[21] Appl. No.: 08/865,012

[22] Filed: May 29, 1997

[51] Int. Cl.$^6$ .................................................... F01N 3/00
[52] U.S. Cl. .............................. 60/274; 60/284; 60/300; 219/202; 219/508; 322/28
[58] Field of Search ........................... 60/274, 284, 300; 322/28; 219/202, 205, 508

[56] References Cited

U.S. PATENT DOCUMENTS

| | | | |
|---|---|---|---|
| 5,095,222 | 3/1992 | Pierret et al. ............................ | 307/10.1 |
| 5,321,231 | 6/1994 | Schmalzriedt et al. ................. | 219/497 |
| 5,645,745 | 7/1997 | Hartwick et al. ........................ | 219/497 |
| 5,757,164 | 5/1998 | Yoshizaki et al. ........................ | 322/28 |
| 5,822,983 | 10/1998 | Ikeda ....................................... | 60/284 |
| 5,841,266 | 11/1998 | Hikita et al. ............................. | 322/8 |

*Primary Examiner*—Thomas E. Denion
*Attorney, Agent, or Firm*—Theodore E. Galanthay; Lisa K. Jorgenson; Renee M. Larson

[57] ABSTRACT

A catalytic converter of an engine, such as might be found in an automotive engine system, is capable of being quickly and electrically heated in order to reduce pollution emissions during critical cold start conditions. During cold start conditions, i.e. upon starting the engine, for a predetermined period of time the catalytic converter directly receives electrical power via a quick heating path connecting a catalyst power switch to the catalytic converter. Following the predetermined period of time after which the catalytic converter has been electrically heated, the catalyst power switch is connected to a junction block, such as a starter motor assembly, of the automotive engine system via a normal path.

20 Claims, 1 Drawing Sheet

GENERATOR POWER ELECTRICALLY HEATED CATALYST SYSTEM

BACKGROUND OF THE INVENTION

The present invention relates generally to generator powered electrically heated catalyst systems and more specifically to generator powered electrically heated catalyst systems for automotive applications.

Modern internal combustion powered vehicles utilize a catalytic converter in the exhaust system. This converter by means of chemical reactions converts much of what would otherwise be undesirable exhaust gases into carbon dioxide and water. This has been a preferred solution, and unleaded gasoline permits the use of catalytic converters in automotive applications, since catalytic converters cannot tolerate any lead content in the exhaust fumes.

Today cars are so clean burning that most of the undesirable exhaust emissions at the output of the catalytic converter occurs within the first few minutes of engine operation from a cold start. This occurs because the catalytic converter does not operate at peak efficiency when it is cold, and a warm-up time of about ten minutes from a cold start is typically required before peak catalytic converter efficiency is reached and maintained. Current legislation dictates that these few minutes of relatively high emissions must be minimized. This establishes the need to artificially heat the catalytic converter quickly upon a cold start.

One method known in the prior art to accomplish this involves injecting a rich air/fuel mixture into the combustion chamber which will exhaust a high hydrocarbon exhaust gas. Oxygen is then injected into the exhaust pipe, causing the heated hydrocarbon rich mixture to ignite in the exhaust pipe before reaching the catalytic converter. This superheated gas then passes through the catalytic converter causing it to heat quickly. This method requires the addition of an air pump, which is cumbersome and draws power from the engine at all times, unless an electrical pump is utilized and cycled by electrical techniques. Air pumps are not known for good reliability, and would present challenges to meeting 100,000 mile exhaust emission system reliability goals.

Other methods are known in the prior art for causing quick initial heating of the catalytic converter. One example is the oversized crystal controlled oscillator common to electronics. When initially powered on from a cold start, the oversized crystal controlled oscillator utilizes an internal feedback loop which applies maximum heating power to its heating elements, gradually reducing this power as the desired temperature operating point is approached. Another prior art example is the technique utilized to achieve quick heating of windshields in cold environmental conditions, wherein unregulated electrical power is applied to the heating element. This heating system is elemental, and the heating voltage is sawtooth in nature with a high peak-to-valley ratio as the power delivered to the windshield heaters does not have to be accurately known.

No other prior art method to electrically heat automotive catalytic converters is known.

The method of the present invention involves interfacing with the electrical charging systems of automobiles as commonly known to the art. For that reason a basic description of a typical prior art automotive electrical charging system follows.

The charging system maintains a constant voltage to the electrical system of the automobile. This voltage is regulated by means of a feedback loop which utilizes a generator, bridge rectifier, and voltage regulator. The voltage regulator controls the amount of excitation current present in the field windings of the generator. The speed of rotation of the generator and the amount of field current determine the amount of power supplied by the generator/bridge rectifier to the automotive electrical system. The amount of field current is controlled by the voltage regulator, which monitors the voltage level in the electrical system and adjusts the field current in a manner so as to maintain the constant voltage.

Modern voltage regulators are of various constructions, and may be of monolithic, hybrid or printed circuit types. Several regulator features require discussion here because they are utilized by the present invention. These are reduced setpoint regulation, external or battery sensing, and overvoltage regulation protection.

Reduced setpoint regulation is commanded by providing a logic low signal to the Lamp (L) input terminal of the voltage regulator. During normal rotation of the generator, if the L terminal is brought low the regulator will establish a regulation set point of 75% of the "normal" regulation set point. Regulators also contain an ignition (I) input terminal which functions similarly, but only the L input terminal will be discussed.

Regulators have the ability to sense the battery voltage via a specialized input Sense (S) terminal. Remote sensing allows for more accurate remote voltage sensing because the S input typically is designed to have a relatively high input resistance.

Overvoltage regulation protection is required if, for some reason, the output of the generator is disconnected from the vehicle's electrical system. What then happens is that the S terminal sees a drop in voltage due to the generator no longer providing energy to the electrical system (which includes the battery) and commands full excitation current in the generator field windings. This causes a maximum output condition of the generator. With the output of the generator disconnected from the electrical system (which is the generator load) the output of the generator is uncontrolled and can go to the limits of the generator. This may cause catastrophic damage to the internal parts of the generator and other loads connected thereto, which is not acceptable. The overvoltage protection feature will not allow the Vgo terminal to go above a specified voltage level by limiting the field current if this level starts to be exceeded. This restriction on field current is reduced as the voltage on the Vgo terminal starts to reduce, thus establishing a pseudo regulation point at what is termed the overvoltage threshold.

Increasingly stringent exhaust emission regulations require that emitted pollutants occurring during cold start be reduced. An electrical solution wherein the catalytic converter is quickly heated, by simple electrical means, is seen as the most viable and economical solution, but prior art does not teach the required electrical heating technique for automotive catalytic converters. There is thus an unmet need in the art to describe a technique wherein electrical techniques are utilized in a simple and economical manner to heat automotive catalytic converters quickly in cold-start conditions, thereby reducing exhaust emissions.

SUMMARY OF THE INVENTION

It is an object of the present invention to provide an electrical technique and structure for heating catalytic converters quickly in cold-start conditions in order to reduce exhaust emissions.

Therefore, according to the present invention, a catalytic converter of an engine, such as might be found in an automotive system, is capable of being quickly and electrically heated in order to reduce exhaust emissions during critical cold start conditions. During cold start conditions, i.e. upon starting the engine, for a predetermined period of time the catalytic converter directly receives electrical power via a quick heating path connecting a catalyst power switch to the catalytic converter. Following the predetermined period of time after which the catalytic converter has been electrically heated, the catalyst power switch is connected to a junction block of the automotive engine system via a normal path.

The electrical charging system of the present invention has several elements in addition to the catalytic converter. A junction block has an electrical node that serves as a common tie point of the system. A control module generates a first control signal and a second control signal. A generator receives the first control signal generated by the control module and generates a direct current. The regulator function of the generator is turned on or off in response to the first control signal. A switch is switched to a first output terminal or a second output terminal in response to the second control signal generated by the control module. Until the engine of the system is started, the switch is not activated and the first output terminal of the relay switch contact of the switch is connected to the electrical node of the junction block to define a normal path. However, when the engine of the system is started, the switch is activated and the second output terminal of the relay switch contact of the switch is connected to the catalytic converter for a predetermined period of time to define a quick heating path that electrically heats the catalytic converter.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawing, wherein:

DESCRIPTION OF THE INVENTION

Figure 1:
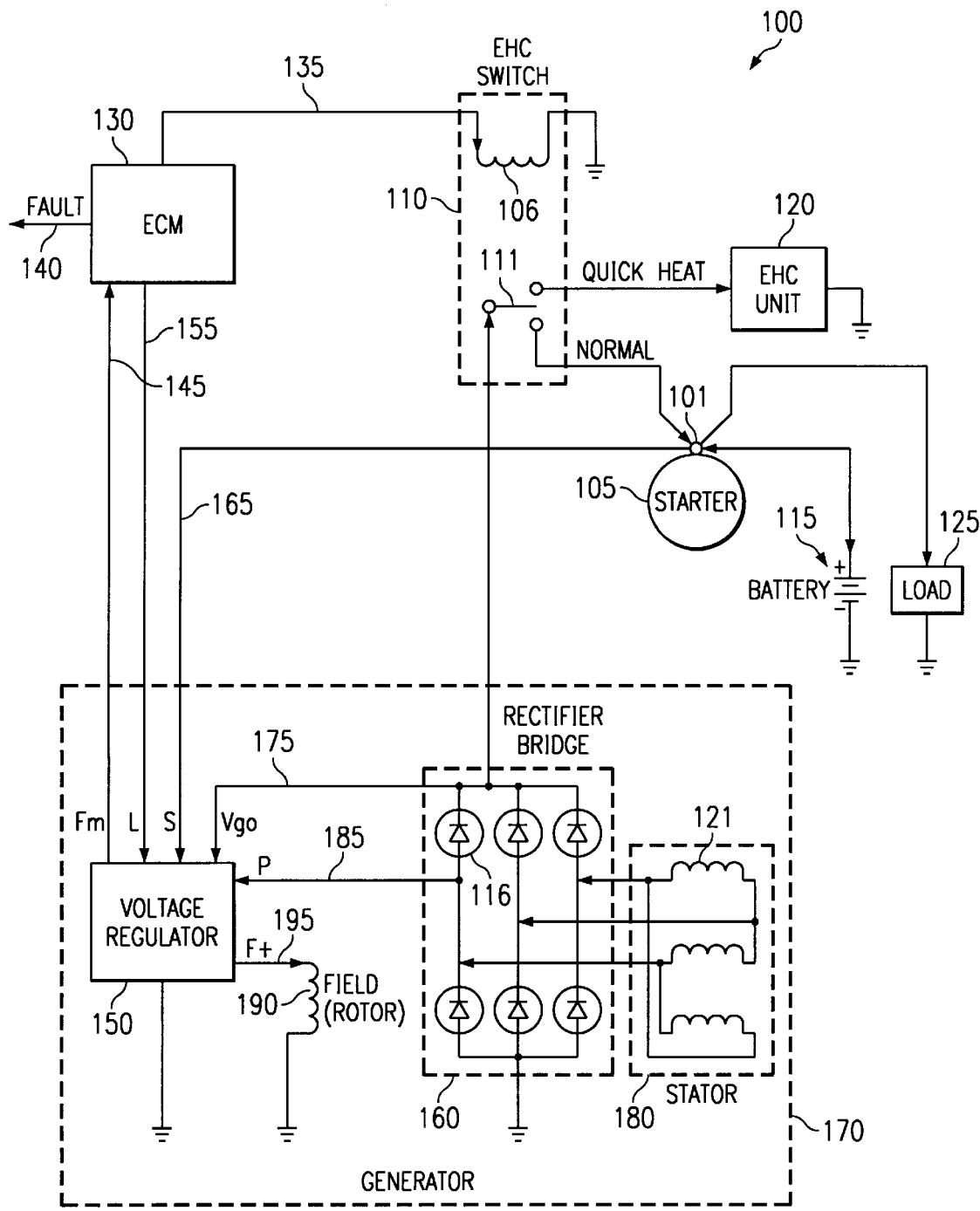
FIG. 1 is an electrical diagram of a generator powered electrically heated catalyst system, according to the preferred embodiment of the present invention.

The present invention provides an electrical charging system that combines the proven features of conventional automotive charging systems with minimal extra circuitry to provide quick electrical heating of the catalytic converter to reduce exhaust emissions during critical cold start conditions. The prior art solution for quick-heating the catalytic converter is a chemical one with an air pump having decreased reliability and increased cost compared to the electrical technique of the present invention.

Referring to FIG. 1, an electrical diagram of a Generator Powered Electrically Heated Catalyst System 100, according to the present invention is shown. The electrical charging system represented by Generator Powered Electrically Heated Catalyst System 100 of FIG. 1 may be an automotive electrical system or any other internal combustion system having a charging system. Junction Block Connection Point 101 is the common electrical system tie point usually located at the Starter Assembly Unit 105, commonly on the starter solenoid. Junction Block Connection Point 101 can be on the Starter Assembly Unit 105 or typically may be located anywhere within the engine compartment. Battery 115 is the automobile DC battery. Electrical System Load 125 represents all the electrical circuits that normally load the vehicular electrical system. Generator 170, also known as an alternator, produces electrical power to charge the automotive electrical system in the usual manner, being excited by field current in Generator Rotor Field Winding 190 and being mechanically rotated by the operating engine. Generator 170 contains Generator Rotor Field Winding 190, Generator Stator 180, Rectifier Bridge 160, and Regulator 150. Generator Stator 180 contains Generator Stator Windings 121 which output three-phase electrical power to Rectifier Bridge 160. The present embodiment illustrates Generator Stator Windings 121 as a delta winding; however, the invention is equally applicable to generators having Y-windings. Rectifier Bridge 160 contains six Rectifier Diodes 116, and serves to transform the three-phase output of Generator Stator 180 to direct current (DC) which is then distributed to the automobile electrical system.

The DC output of Rectifier Bridge 160 is routed to the switch common of Relay Single Pole Double Throw (SPDT) Switch Contacts 111, and to Voltage Regulator Vgo Input 175 of Voltage Regulator 150. Electrically Heated Catalyst Power Switch (EHC Switch) 110 contains an electrical relay, composed of Relay Coil 106 which controls the position of Relay SPDT Switch Contacts 111. One output of Relay SPDT Switch Contacts 111 is routed to Junction Block Connection Point 101, and is the current path normally found in automobile electrical systems. The other output of Relay SPDT Switch Contacts 111 is routed to Electrically Heated Catalyst (EHC) 120, and this is the path whereby Electrically Heated Catalyst 120 receives electrical power for catalytic converter quick heating. As will be explained further, Relay SPDT Switch Contacts 111 is connected through the normal path to Junction Block Connection Point 101 until the engine has started, and then is switched over to the Quick Heat path by Relay SPDT Switch Contacts 111 for a fixed time duration, such as approximately 30 seconds, sufficient to furnish heating power to the heating elements of Electrically Heated Catalyst 120.

Voltage Regulator 150 has four inputs and two outputs. The four inputs are Voltage Regulator Lamp Input 155 (L), Voltage Regulator Remote Sense Input 165 (S), Voltage Regulator Vgo Input 175 (the output voltage from Rectifier Bridge 160), and Voltage Regulator Phase Input 185 (P). The outputs of Voltage Regulator 150 are Voltage Regulator Field Output 195 (F+) and Voltage Regulator Field Monitor Input 145 (Fm). Voltage regulator Remote Sense Input 165 is utilized to monitor electrical system voltage in the usual manner, and is connected to Junction Block Connection Point 101. Voltage Regulator Vgo Input 175 monitors the DC output of Rectifier Bridge 160, being connected to the rectified output of Rectifier Bridge 160, and also serves as the current source for regulator 150 and the Generator Rotor Field Winding 190. Voltage Regulator Phase Input 185 receives the phase signal from Rectifier Bridge 160, which is used by Voltage Regulator 150 to monitor possible failures internal to the combination of Rectifier Bridge 160 and Generator Stator 180. Voltage Regulator Lamp Input 155 receives a signal from Control Module 130, wherein Voltage Regulator Lamp Input 155 is utilized to control the on/off condition of Voltage Regulator 150, as will be explained later. Voltage Regulator Field Monitor Output 145 is used for diagnostic purposes. Voltage Regulator Field Output 195 furnishes the current to excite Generator Rotor Field Winding 190, and this excitation current combined with engine speed and Electrical System Load 125 current determines the output of Generator Stator Windings 121, the DC voltage output by Rectifier Bridge 160, and consequently the voltage present at Voltage Regulator Vgo Input 175 and the common terminal of Relay SPDT Switch Contacts 111.

A Control Module is capable of controlling both EHC Switch 110 and Voltage Regulator 150 as shown in FIG. 1. For instance, the control module may take many forms, such as a conventional Engine Control Module (ECM) or an Electrically Heated Catalyst (EHC) control module. In the case of an ECM, the control module is a very complex, having a multitude of functions concerned with engines and the electronic control of engines but only a few ECM functions are utilized by the present invention. Control Module 130 provides three outputs utilized in the present invention. These outputs are Fault Output 140, Switch Control Output 135, and Voltage Regulator Lamp Input 155. Fault Output 140 is used to indicate that a fault has occurred in the electrical charging system and depends upon design requirements of the system. Switch Control Output 135 is utilized to energize Relay Coil 106 to change the state of Relay SPDT Switch Contacts 111. Voltage Regulator Lamp Input 155 is routed to input L of Voltage Regulator 150, and this function has been previously discussed.

Electrically Heated Catalyst 120 is the catalytic converter/heater assembly which is capable of being quickly heated when appropriate power is routed to it via the quick heat contact path through Relay SPDT Switch Contacts 111.

In operation, in response to an engine start, Control Module 130 reduces the regulation voltage setpoint of Voltage Regulator 150 by commanding Voltage Regulator Lamp Input 155 to a logic level low, thereby reducing engine load torque at engine start-up. Then Relay SPDT Switch Contacts 111 of Electrically Heated Catalyst Power Switch 110 disconnects the charging system (generator DC output) from the vehicle's electrical system (the path through Relay SPDT Switch Contacts 111 to Junction Block Connection Point 101), and connects the charging system to the heating elements within Electrically Heated Catalyst 120. Control Module 130 then causes Voltage Regulator 150 to run at normal regulation by commanding Voltage Regulator Lamp Input 155 to a logic level high. At this point the voltage of Battery 115 is lower than the commanded regulation point (as sensed by the voltage regulator remote sense input). This in turn causes Voltage Regulator 150 to command a "full-on" output of Generator 170 by fully energizing the Generator Rotor Field Winding 190, and Generator 170 will go to its maximum output for the speed at which it is operating, or until the overvoltage protection feature of Voltage Regulator 150 activates. In either case an elevated voltage is applied to the heating elements of Electrically Heated Catalyst 120, causing them to heat as quickly as possible. Note that the overvoltage condition is controlled due to the overvoltage protection feature of Voltage Regulator 150. An important aspect of the present invention is that the current through the Generator Rotor Field Winding 190 is delivered at the elevated output of Generator 170 and not at a lower setpoint regulation voltage or vehicle system voltage. This particular method of furnishing increased electrical power to Electrically Heated Catalyst 120 during quick heating was chosen because the characteristics of Generator 170 provide increased efficiency at elevated output voltages and high engine revolutions-per-minute (RPM), a condition which normally occurs during cold start high engine idle.

When Electrically Heated Catalyst Power Switch 110 is not activated and quick heating power is not being supplied to Electrically Heated Catalyst 120, the sense input utilized by Voltage Regulator 150 is Voltage Regulator Remote Sense Input 165. When Electrically Heated Catalyst Power Switch 110 is activated and quick heating power is supplied to Electrically Heated Catalyst 120, the voltage at Voltage Regulator Remote Sense Input 165 drops below its previous value (the normal (or typical) charging system output will always exceed the voltage of a static Battery 115), causing the maximum output or overvoltage regulation condition previously discussed. Note that the normal feedback loop from the output of Rectifier Bridge 160 to Remote Sense Input 165 via Junction Block Connection Point 101 has been interrupted by activation of Relay SPDT Switch Contacts 111. Consequently, the voltage at Voltage Regulator Vgo Input 175 will rise until either Generator 170 reaches output saturation or overvoltage protection activates. The value of overvoltage at which overvoltage protection activates is designed for the desired maximum for Electrically Heated Catalyst 120 and the capability of Rectifier Bridge 160.

It is to be noted that when Electrically Heated Catalyst Power Switch 110 is activated, the Voltage Regulator Lamp Input 155 is commanded low to cause the current in Generator Rotor Field Winding 190 initially to be turned off so that Electrically Heated Catalyst Power Switch 110 can be switched in a dry (unpowered) state. This is a decided advantage, since the disadvantages of contact switching with significant power applied are well known.

As is clear from the preceding descriptions, a novel technique for electrically heating the catalyst system using generator power in an automotive application has been described. One advantage of the technique is that no separate sensing connection to Electrically Heated Catalyst 120 is required to limit or regulate the quick heat power to Electrically Heated Catalyst 120. Further, it is a decided advantage that operating power to Voltage Regulator 150 (Voltage Regulator Vgo Input 175) is derived from the generator output. The added voltage is used to further excite the field windings causing even greater output capability of the generator system. It is also an advantage of the present technique that when Electrically Heated Catalyst Power Switch 110 switches, it is dry switching with power removed from Relay SPDT Switch Contacts 111, whether Electrically Heated Catalyst Power Switch 110 is implemented with a mechanical relay or a solid state switch. Also setpoint voltage for reduced engine loading when not in the quick heat mode is achieved by control of the logic level state at Voltage Regulator Lamp Input 155. This accounts for a no current state of the output when switching between normal operation and the quick heating mode without turning off the regulator. This allows a faster cycle time for the start of catalyst heating.

While the invention has been particularly shown and described with reference to a preferred embodiment, it will be understood by those skilled in the art that various changes in form and detail may be made therein without departing from the spirit and scope of the invention.

What is claimed is:

1. An electrical charging system that provides for quick electrical heating of a catalytic converter, comprising:

a junction block having an electrical node that serves as a common tie point of the electrical charging system;

a control module that generates a first control signal and a second control signal;

a generator, having a voltage regulator that is integral to the generator, that receives the first control signal generated by the control module and that generates a direct current, wherein the generator is turned on or off in response to the first control signal, and wherein if the generator is functional and rotating then the first control signal is forced to an off-state and the generator enters a reduced set point mode of the voltage regulator;

a switch having a relay switch contact that has a first output terminal and a second output terminal, wherein whether the switch is switched to the first output terminal or the second output terminal is controlled by the second control signal generated by the control module; and a catalyst;

wherein when the engine of the electrical charging system is not started, the switch is not activated and the first output terminal of the relay switch contact of the switch is connected to the electrical node of the junction block to define a normal path; and wherein when the engine of the electrical charging system is started, the switch is activated and the second output terminal of the relay switch contact of the switch is connected to the catalyst for a predetermined period of time to define a quick heating path that electrically heats the catalyst.

2. The system of claim 1, wherein the direct current is generated by a rectifier bridge of the generator.

3. The system of claim 1, wherein the generator further comprises:

a generator rotor field winding;

a generator stator, wherein the generator stator has generator stator windings that generator three-phase electrical power;

a rectifier bridge, wherein the three-phase electrical power generated by the generator stator is supplied to the rectifier bridge and the rectifier bridge transforms the three-phase electrical power to direct current, and wherein the rectifier bridge has a plurality of rectifier diodes; and a regulator that performs a regulator function of the generator and that has a first input terminal for receiving direct current generated by the rectifier bridge of the generator in order to monitor and control the voltage of the rectifier bridge, a second input terminal for receiving a phase signal from the rectifier bridge that provides information on the rotation of the generator in order to monitor any failure internal to the rectifier bridge and the generator stator, a third input terminal for receiving the first control signal from the control module capable of turning the regulator on or off, a fourth input terminal for receiving a monitor signal from the junction block in order to monitor the voltage of the electrical charging system, and that generates an excitation current that excites the generator rotor field winding.

4. An electrical charging system that provides for quick electrical heating of a catalytic converter, comprising:

a junction block having an electrical node that serves as a common tie point of the electrical charging system;

a load coupled to the junction block;

a control module that generates a first control signal and a second control signal;

a generator that produces electrical power to charge the electrical charging system, wherein the generator comprises:

a generator rotor field winding;

a generator stator, wherein the generator stator has generator stator windings that generater three-phase electrical power;

a rectifier bridge, wherein the three-phase electrical power generated by the generator stator is supplied to the rectifier bridge and the rectifier bridge transforms the three-phase electrical power to direct current, and wherein the rectifier bridge has a plurality of rectifier diodes; and a regulator that has a first input terminal for receiving direct current generated by the rectifier bridge of the generator, a second input terminal for receiving a phase signal from the rectifier bridge that provides information on the rotation of the generator, a third input terminal for receiving the first control signal from the control module capable of turning the regulator on or off, a fourth input terminal for receiving a monitor signal from the junction block in order to monitor the voltage of the electrical charging system, and that generates an excitation current that excites the generator rotor field winding;

wherein if the generator is functional and rotating, then the first control signal is forced to an off-state and the regulator enters a reduced set point mode;

a switch, having an electrical relay and a relay switch contact that receives the direct current generated by the rectifier bridge and that has a first output terminal and a second output terminal, wherein the electrical relay controls the position of the relay switch contact in response to the second control signal generated by the control module; and a catalyst;

wherein when the engine of the electrical charging system is not started, the switch is not activated and the first output terminal of the relay switch contact of the switch is connected to the electrical node of the junction block to define a normal path; and wherein when the engine of the electrical charging system is started, the switch is activated and the second output terminal of the relay switch contact of the switch is connected to the catalyst for a predetermined period of time to define a quick heating path that electrically heats the catalyst.

5. An electrical charging system that provides for quick electrical heating of a catalytic converter, comprising:

a junction block having an electrical node that serves as a common tie point of the electrical charging system;

a load coupled to the junction block;

a control module that generates a first control signal and a second control signal;

a generator that produces electrical power to charge the electrical charging system and that is mechanically rotated by an engine of the electrical charging system, wherein the generator comprises:

a generator rotor field winding;

a generator stator, wherein the generator stator has generator stator windings that generator three-phase electrical power;

a rectifier bridge, wherein the three-phase electrical power generated by the generator stator is supplied to the rectifier bridge and the rectifier bridge transforms the three-phase electrical power to direct current, and wherein the rectifier bridge has a plurality of rectifier diodes; and a regulator that has a first input terminal for receiving direct current generated by the rectifier bridge of the generator in order to control the voltage of the rectifier bridge, a second input terminal for receiving a phase signal from the rectifier bridge that provides information on the rotation of the generator in order to monitor any failure internal to the rectifier bridge and the generator stator, a third input terminal for receiving the first control signal from the control module capable of turning the regulator on or off, a fourth input terminal for receiving a monitor signal from the junction block in order to monitor the voltage of the electrical charging system, and that generates an excitation current that excites the generator rotor field winding;

wherein when the generator is functional and rotating, then the first control signal is forced to an off-state and the regulator enters a reduced set point mode;

a catalyst power switch, having an electrical relay and a relay switch contact that receives the direct current generated by the rectifier bridge and that has a first output terminal and a second output terminal, wherein the electrical relay controls the position of the relay switch contact in response to the second control signal generated by the control module; and a catalyst;

wherein when the engine of the electrical charging system is not started, the switch is not activated and the first output terminal of the relay switch contact of the catalyst power switch is connected to the electrical node of the junction block to define a normal path; and wherein when the engine of the electrical charging system is started, the catalyst power switch is activated and the second output terminal of the relay switch contact of the catalyst power switch is connected to the catalyst for a predetermined period of time to define a quick heating path that electrically heats the catalyst.

6. The system of claim 5, wherein the electrical node is located on a starter solenoid of the junction block.

7. The system of claim 5, wherein the load is comprised of a plurality of electrical circuits that load the electrical charging system.

8. The system of claim 5, wherein the electrical relay of the catalyst power switch is a relay coil and wherein the second control signal generated by the control module energizes the relay coil to change the position of the relay switch contact.

9. The system of claim 5, wherein the relay switch contact of the catalyst power switch is a single pole double throw (SPDT).

10. The system of claim 5, wherein the catalyst is the catalytic converter of the electrical charging system capable of being electrically heated.

11. The system of claim 5, wherein when the engine of the electrical charging system is started, the regulator causes the generator to generate an elevated voltage in order to heat the catalyst at an accelerated rate.

12. The system of claim 11, wherein regulator of the generator does not permit the elevated voltage to reach an overvoltage condition.

13. The system of claim 12, wherein the overvoltage condition is determined in part by the rectifier bridge.

14. The system of claim 5, wherein when the engine of the electrical charging system is started and the quick heating path is established, the regulator does not generate an excitation current and the catalyst power switch is capable of being switched in an unpowered state.

15. A method for providing quick electrical heating of the catalytic converter of an engine so as to reduce pollution emissions during cold start of the engine, comprising:

upon starting the engine, switching from a normal path defined as the connection between a power switch and a starter assembly to a quick heating path defined as the connection between the power switch and the catalytic converter for a predetermined period of time;

after the predetermined period of time, switching from the quick heating path back to the normal path; and if a generator of the engine, having a voltage regulator that is integral to the generator, is functional and rotating, entering a reduced set point mode of the voltage regulator.

16. The method of claim 15, wherein the normal path is the connection between a relay switch contact of the power switch and the starter assembly and the quick heating path is the connection between the relay switch contact and the catalytic converter.

17. The method of claim 15, wherein switching to the quick heating path for the predetermined period of time heats the catalytic converter.

18. The method of claim 15, wherein in the quick heating path, the power switch is activated and in the normal path, the power switch is not activated.

19. The method of claim 15, wherein the normal path is the connection between a first output of the relay switch contact and the starter assembly and the quick heating path is the connection between a second output of the relay switch contact and the catalytic converter.

20. The method of claim 15, wherein the step of entering the reduced set point mode of the voltage regulator is controlled by a control signal generated by a control module of the engine.

* * * * *